(12) United States Patent
Ferrari et al.

(10) Patent No.: US 10,203,205 B2
(45) Date of Patent: Feb. 12, 2019

(54) BRACKET FOR WHEEL ALIGNMENT CONTROL INSTRUMENTS FOR VEHICLE WHEELS

(71) Applicants: Gino Ferrari, Correggio (IT); Franco Maioli, Correggio (IT)

(72) Inventors: Gino Ferrari, Correggio (IT); Franco Maioli, Correggio (IT)

( * ) Notice: Subject to any disclaimer, the term of this patent is extended or adjusted under 35 U.S.C. 154(b) by 0 days.

(21) Appl. No.: 15/778,817

(22) PCT Filed: Dec. 1, 2016

(86) PCT No.: PCT/IB2016/057242
§ 371 (c)(1),
(2) Date: May 24, 2018

(87) PCT Pub. No.: WO2017/093922
PCT Pub. Date: Jun. 8, 2017

(65) Prior Publication Data
US 2018/0347974 A1  Dec. 6, 2018

(30) Foreign Application Priority Data
Dec. 2, 2015 (IT) .......................... 102015000078910

(51) Int. Cl.
*G01B 5/255* (2006.01)
*G01B 21/26* (2006.01)
*G01B 5/00* (2006.01)

(52) U.S. Cl.
CPC ........... *G01B 21/26* (2013.01); *G01B 5/0004* (2013.01); *G01B 2210/10* (2013.01)

(58) Field of Classification Search
CPC ...................................................... G01B 5/255

USPC ................................................ 33/203, 203.18
See application file for complete search history.

(56) References Cited

U.S. PATENT DOCUMENTS

| 4,377,038 | A |   | 3/1983  | Ragan  |              |
|-----------|---|---|---------|--------|--------------|
| 5,052,111 | A | * | 10/1991 | Carter | G01B 5/255   |
|           |   |   |         |        | 33/203.18    |
| 6,131,293 | A | * | 10/2000 | Maioli | G01B 5/255   |
|           |   |   |         |        | 33/203       |
| 2002/0170195 | A1 | * | 11/2002 | Corghi | G01B 5/255 |
|           |   |   |         |        | 33/520       |

(Continued)

FOREIGN PATENT DOCUMENTS

EP  1626247  2/2006
FR  3016691  7/2015

*Primary Examiner* — G. Bradley Bennett
(74) *Attorney, Agent, or Firm* — Themis Law

(57) ABSTRACT

A bracket for wheel alignment control instruments for vehicle wheels includes a central body having a center, an outer face and an opposing parallel inner face facing a wheel; three gripping arms, the ends of which are distal to the center, have grip members and are simultaneously slidingly mounted onto the central body to slide in radial directions, driven by a first drive system and guided by first guide devices between wheel gripping or releasing positions; spacers holding the bracket, parallel to one side of the wheel, which are simultaneously movable in radial directions relative to the center through adjustable abutment positions, the spacers being slidingly mounted onto the central body to slide independent of the arms, driven by a second drive system independent of the first drive system and guided by the first guide devices.

10 Claims, 5 Drawing Sheets

(56) References Cited

U.S. PATENT DOCUMENTS

| | | | |
|---|---|---|---|
| 2005/0206098 A1* | 9/2005 | Ohnesorge | B60B 7/18 |
| | | | 279/46.1 |
| 2008/0209744 A1* | 9/2008 | Stieff | G01B 11/2755 |
| | | | 33/203.18 |
| 2011/0146089 A1* | 6/2011 | Gray | G01B 5/255 |
| | | | 33/288 |
| 2014/0115906 A1 | 5/2014 | Pruitt | |
| 2017/0089687 A1* | 3/2017 | Nourdine | G01B 5/25 |

* cited by examiner

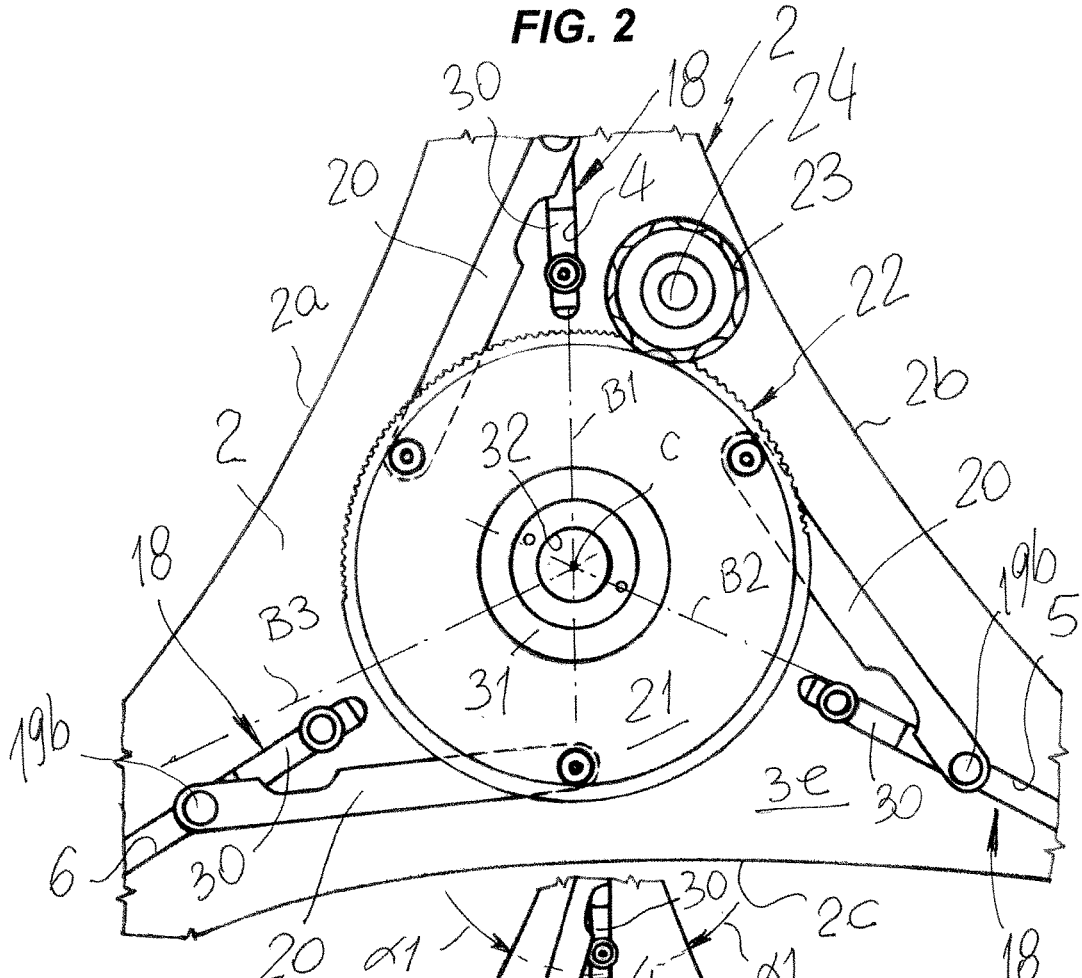

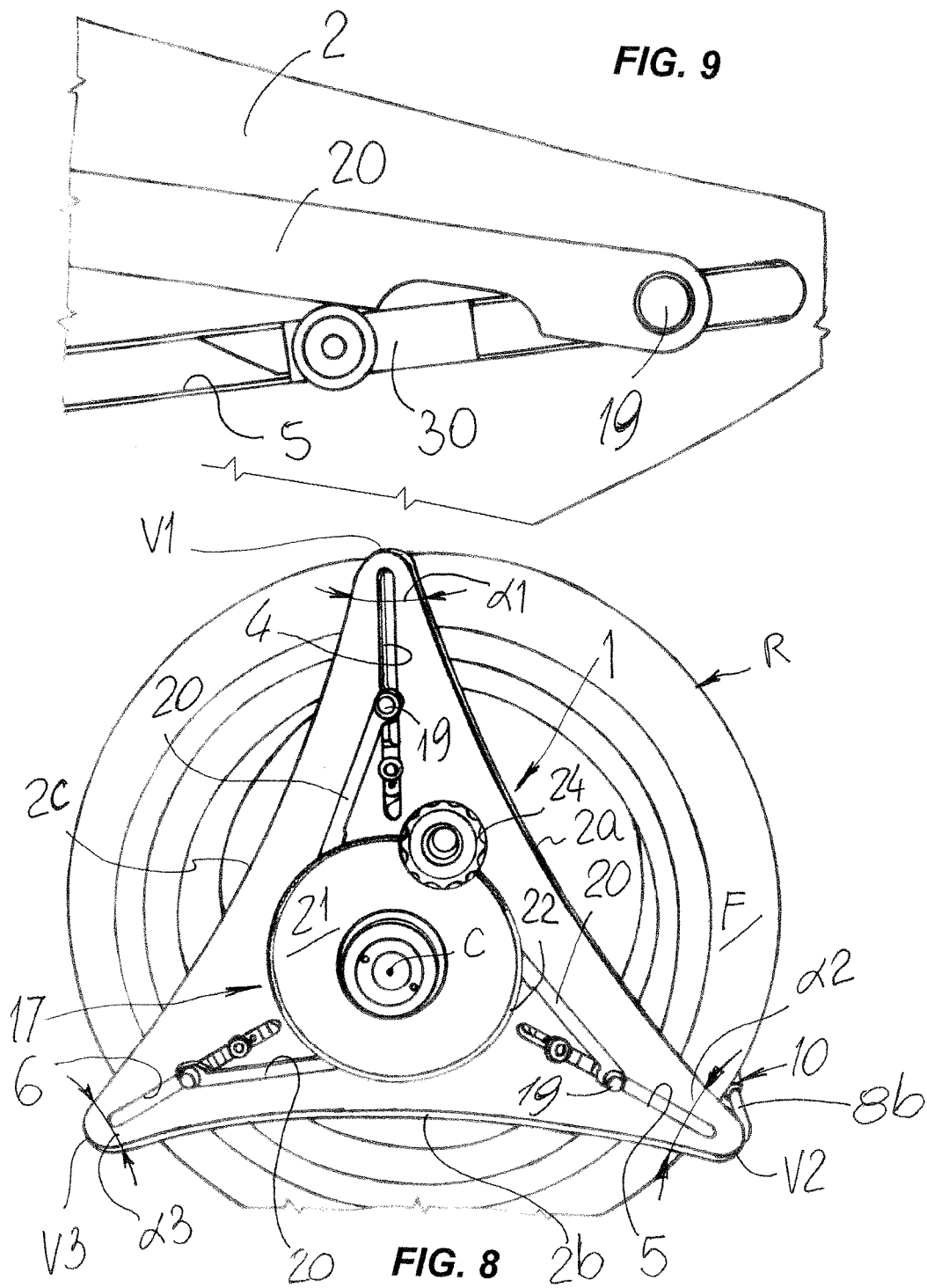

140# BRACKET FOR WHEEL ALIGNMENT CONTROL INSTRUMENTS FOR VEHICLE WHEELS

FIELD OF THE INVENTION

The invention relates to a bracket for wheel alignment control instruments for vehicle wheels, as is generally intended to be used for quickly mounting and removing measurement and control instruments without damaging wheel rims and while ensuring high measurement and control accuracy.

BACKGROUND ART

Vehicle wheel alignment is known to be checked by operators through the use of special brackets that are designed to be movably attached to each wheel and have a central mount, typically a cantilever hub on one face facing the exterior of the vehicle when mounted to the wheel, for known measurement and control instruments to fit thereupon.

These brackets consist of a central body, typically a metal flange, having three arms which radially extend therefrom at 120° from each other and are equipped at their distal ends with grip members facing the tire of a wheel over the tread, to grip upon the grooves of the latter.

The position of the arms, namely their radial position relative to the center of the flange, can be adjusted as needed to move them toward or away from each other, to thereby adapt the brackets to the variety of diameters of commercial wheels.

For this purpose, the distal ends of the arms are bent into an L shape to partially encircle the wheel, in operation, and the grip members consist, for each arm, of clamping jaws with projecting teeth adapted for engagement with the grooves of the tire tread, as mentioned above.

In order to move the arms simultaneously toward and away from the center of the flange, that must coincide with the axis of rotation of the wheel, mutually articulated lever systems are provided, which are controlled by appropriate knobs.

By rotating the knobs in either direction, a movement is simultaneously imparted to all the levers which transfer such movement to the arms, thereby causing them to axially slide in radial directions, guided by guide members provided for this purpose between the arms and the central body.

Accuracy in controls and adjustments for wheel alignment correction requires the bracket apparatus to be mounted in a perfectly centered position relative to the axes of rotation of the wheels.

Therefore, proper positioning of such bracket apparatus is strictly required to provide exact measurements and is typically a matter of skill of the operators, who also have to carry out mounting, removing and measurement operations while ensuring that the wheel rims are not inadvertently damaged.

To obviate this problem, elastic/rubbery pads are placed on the arm shafts, acting as spacers, and designed to abut the side of a wheel tire or rim during mounting and operation of the brackets.

Also in this case, the position of the pads along the shafts should be adjustable to fit the variety of diameters of vehicle wheels.

In prior art brackets, the pads are directly attached to the arms in fixed positions, to be at preset distances from the center of the central body and the centripetal or centrifugal movement of the arms will automatically move the pads toward or away from each other according to the diameters of the wheels.

In other words, a fixed radial distance exists between each jaw and its pad.

This prior art has certain problems.

The first problem is that some bracket types must be manually positioned on the wheels, and this positioning operation only relies on the expertise and accuracy of operators.

Therefore, under certain conditions these bracket types might provide wrong indications, reflecting in wrong data detection and often in inaccurate corrections.

A further problem is that these brackets are not easily handled during a working day because they have a considerable weight and the repeated succession of wheel mounting and removing operations will be harder and harder as time progresses.

In brackets with simultaneous movement of the arms and the pads abutting the sides of the rims or the tires, it may happen that, in spite of an optimal grip position of the jaws on the tire treads, due to the bead height, which may change according to various tire types, the position of the pads, which is fixed relative to the jaws, will become inaccurate relative to the tire bead and hence the position of the pads will not coincide with the tire beads, whereby the abutment and positioning of the bracket on the wheel will become inaccurate, instable or even dangerous for the integrity of the rims.

One object of the invention is to improve the state of the art.

Another object of the invention is to provide a bracket for vehicle wheel alignment control instruments allowing substantially perfect positioning of the instruments relative to the centers of the wheels to obtain accurate measurements, and allow the operators to perform adequate, error-free adjustments.

A further object of the invention is to provide a bracket for vehicle wheel alignment control instruments that is simply positioned, relatively cost effective and easy to use.

In one aspect the invention relates to a bracket for vehicle wheel alignment control instruments as defined in the features of claim 1.

Further features are as set out in the dependent claims.

Therefore, the bracket for vehicle wheel alignment control instruments affords:

perfectly centered positioning of the instruments on the wheels, with respect to the axes of rotation thereof, and inaccuracy-free measurements and adjustments;

wheel rim protection when mounting, operating and removing the brackets, irrespective of the types of tires that have been mounted; and considerably reduced effort for the operators.

BRIEF DESCRIPTION OF THE DRAWINGS

Further characteristics and advantages of the invention will be more apparent from the detailed description of a preferred, non-exclusive embodiment of a bracket for vehicle wheel alignment control instruments, which is shown as non-limiting example in the annexed drawings, in which:

FIG. 2 is a broken-away schematic view of the outer face of the bracket of the invention, in a wheel gripping configuration;

FIG. 3 is a broken-away schematic view of the outer face of the bracket of the invention, in a wheel releasing configuration;

FIG. 8 is a broken-away schematic front view of the bracket of the invention, when mounted to a wheel;

FIG. 9 is an enlarged broken-away view of a detail of FIG. 8.

DETAILED DESCRIPTION OF A PREFERRED EMBODIMENT

Figure 1:
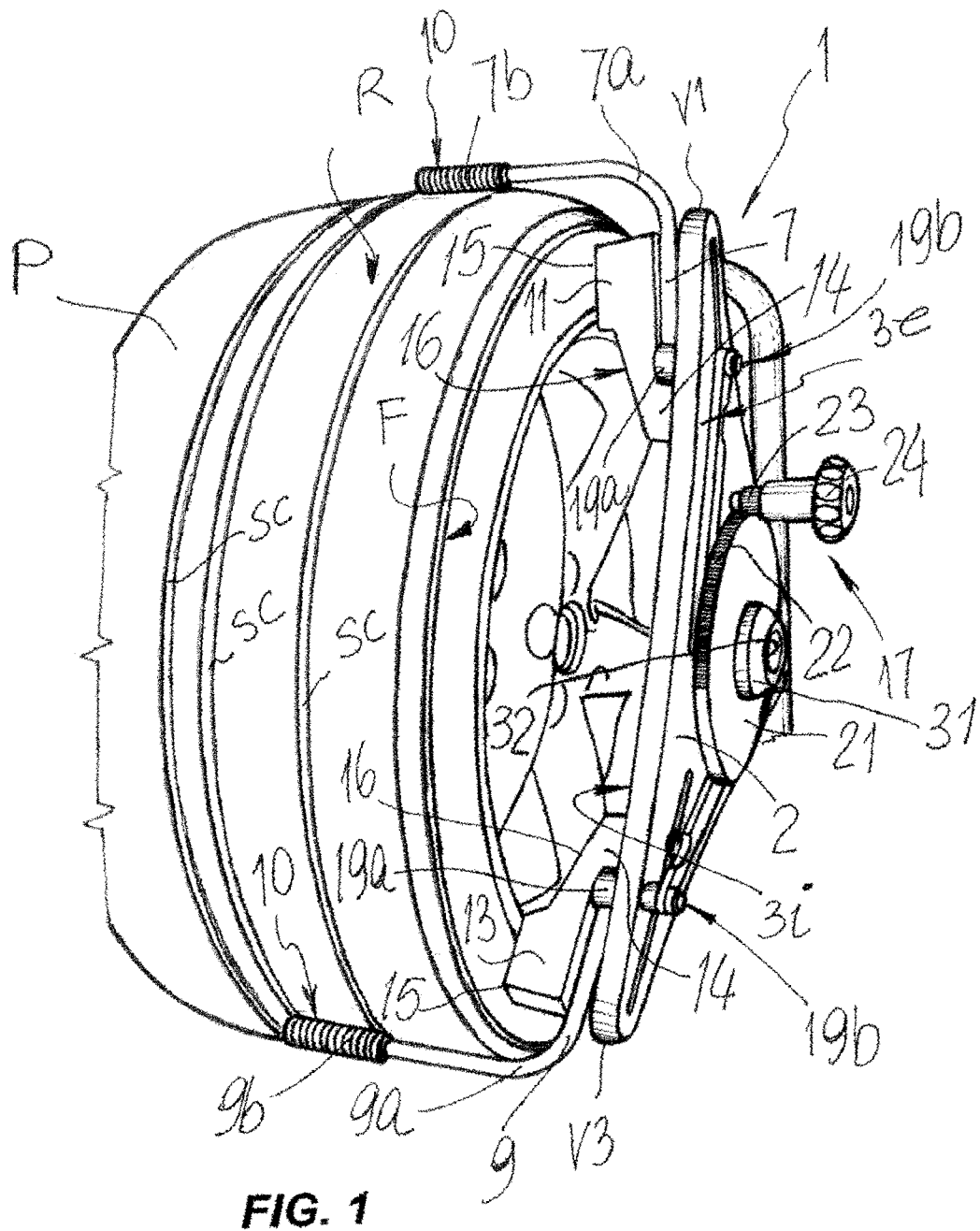
FIG. 1 is a partially broken-away perspective view of a wheel with the bracket of the invention mounted thereto.
Figure 4:
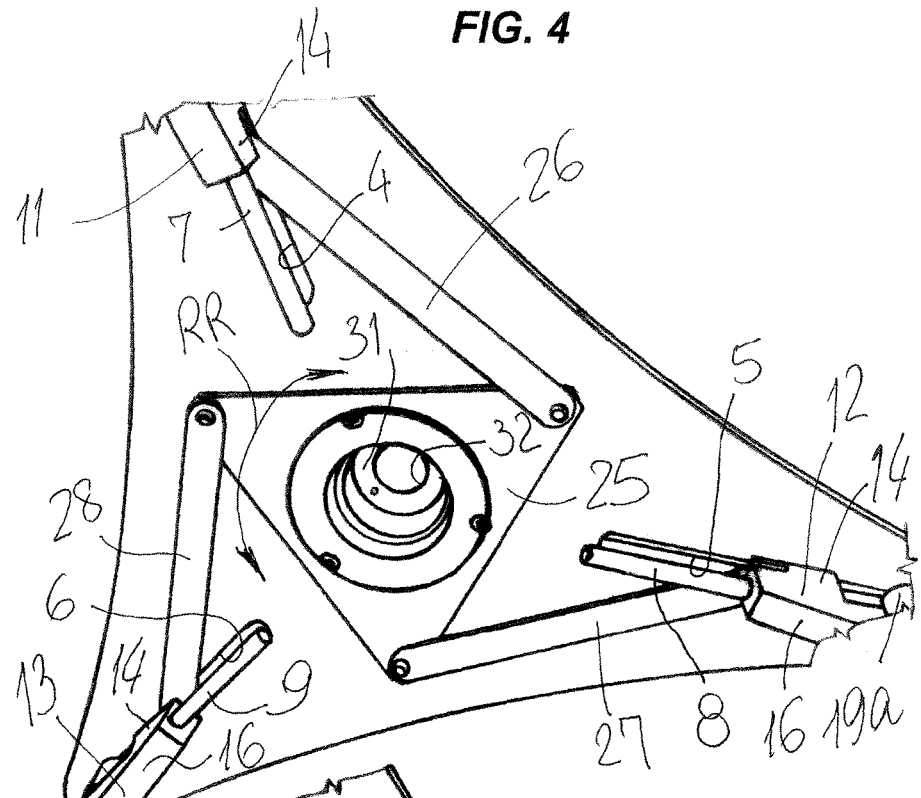
FIG. 4 is a broken-away schematic view of the inner face of the bracket of the invention, in a non-abutment configuration relative to a wheel.
Figure 5:
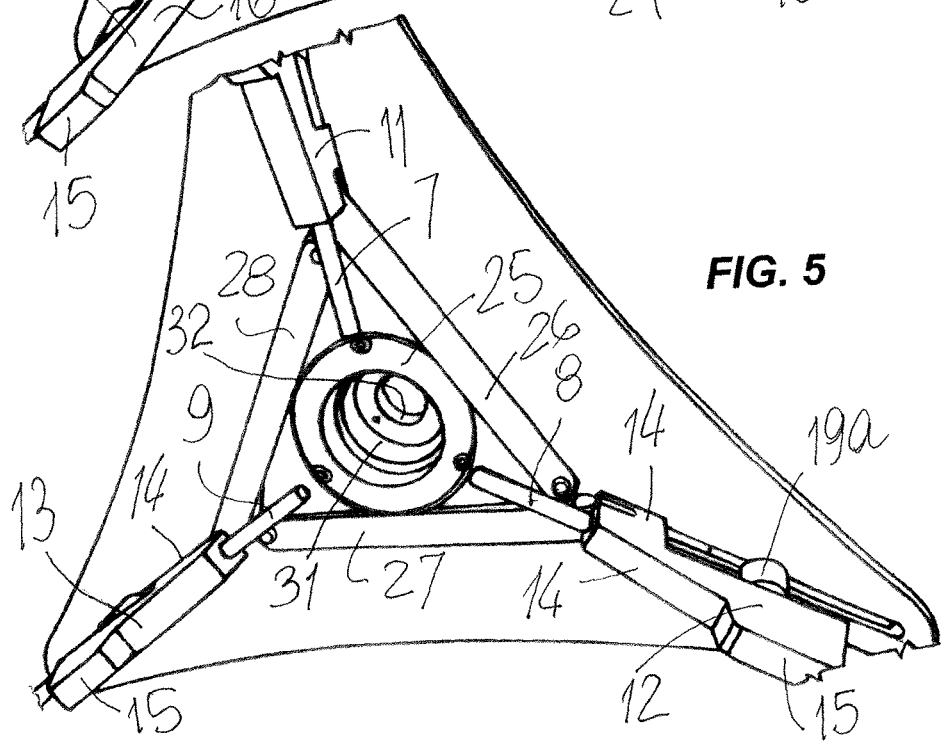
FIG. 5 is a broken-away schematic view of the inner face of the bracket of the invention, in an abutment configuration relative to a wheel.

Referring to the accompanying figures, numeral 1 generally designates a bracket for wheel alignment control instruments for vehicle wheels "R", briefly referred to hereinafter as bracket 1.

The bracket 1 comprises a central body 2, briefly referred to hereinafter as body 2, which preferably has the shape of an equilateral triangle, with slightly concave sides 2a, 2b, 2c.

The body 2 is made of a light-weight material, such as aluminum, aluminum alloys or a synthetic material having a three-dimensional, possibly cellular structure, such as carbon or a honeycomb material, and a center "C" defined by the intersections of the bisectors "B1", "B2", "B3" of the angles "α1", "α2", "α3" of the three vertices "V1", "V2", "V3", and coaxially coincident with the ideal axis of rotation of a wheel "R", when mounted thereupon.

The body 2 has a flat shape and two opposite and parallel faces, namely a face that faces outwards when the bracket 1 is mounted to the wheel "R", referred to as outer face "3e" and an opposite inner face "3i".

As shown in the Figures, at the three bisectors "B1", "B2", "B3", the body is formed with corresponding straight through slots 4, 5, 6, whose purpose will be explained below in greater detail.

The body 2, namely its inner face "3i" has three arms 7, 8, 9 mounted thereto, which radially extend out of the body 2, parallel to the inner face "3i" to project out of the vertices "V1", "V2", "V3" thereof with respective distal end portions 7a, 8a, 9a, which are bent at right angles away from the body 2 and have end segments 7b, 8b, 9b that form projecting crests 10.

Also, three prismatic pads 11, 12, 13 with equal thicknesses "SP" are mounted to the inner face "3i", and form spacer means for abutment of the bracket 1 to the sides of the wheel "R", namely the sides "F" of the tire "P" thereof.

More in detail, each of the prismatic pads 11, 12, 14 has a base 14, a prismatic head 15 that forms a surface 15a designed for contact with the side "F" and an intermediate connecting section 16, which is preferably inclined to hold the base 14 apart from the wheel "R" when the support 1 is mounted to the wheel "R".

As shown in the Figures, the three arms 7, 8, 9 are all supported to be able to move relative to the body 2 by the action of drive means 17 and are guided by first guide means 18.

The drive means comprise, for each of the arms, a shaft 19 that is transversely engaged in a respective through slot 4, 5, 6 and has both ends extending perpendicularly beyond the two faces "3i" and "3e", namely with a head 19a extending out of the inner face "3i" and a foot 19b extending in the opposite direction, i.e. out of the outer face "3e"

Each head 19a has a respected arm extending therethrough and fixed thereto, i.e. not able to slide.

At each foot 19b the concurrent end of a first connecting rod 20 is hinged (a first triad of rods being formed), the connecting rod being parallel to the outer face "3e" and having the opposite end hinged by a central disk 21 which is supported by the central body 2 to rotate in both directions and is also parallel to the outer face "3e".

The disk 21 is peripherally equipped with a rack 22 which engages with a pinion 23 that forms the base of an operating knob 24, the latter being rotatably supported by the body 2 with an axis of rotation perpendicular thereto.

The disk 21 with the rack 2 and the knob 24 with the pinion 23 form the drive means 17 for simultaneously driving the arms 7, 8, 9 and the through slots 4, 5, 6 are the guide means 18 therefor.

A triangular plate 25 is rotatably arranged on the inner face "Si", and is coaxial to the disk 21 but may be rotated independently of the latter in both directions according to the arrows "RR".

At the vertices of the triangular plate 25, corresponding ends of three second connecting rods 26, 27, 28 are hinged (a second triad of rods being formed, which moves independent of the first triad), such rods being hinged, at the opposite ends, to the bases 14 of the respective prismatic pads 11, 12, 13.

The latter are mounted to their respective arms 7, 8, 9 to slide simultaneously, regardless of the position that the latter assume.

Figure 6:
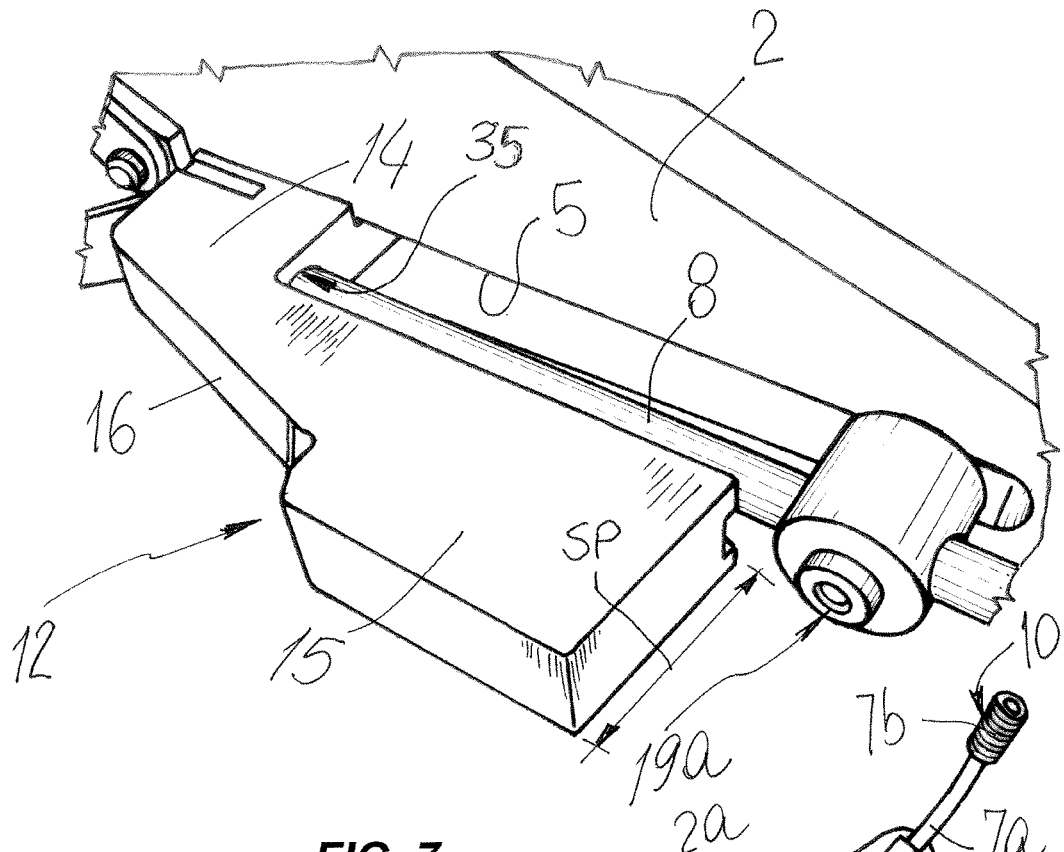
FIG. 6 is an enlarged broken-away schematic view of a detail of FIG. 5.

In detail, as shown in the Figures, each of the prismatic pads 11, 12, 13 have a respective arm 7, 8, 9 longitudinally extending therethrough and are slidingly received in respective sliding seats 35 (FIG. 6) formed in the bases 14.

The connecting rods 26, 27, 28 have their ends hinged to the bases 14 of their respective prismatic pads 11, 12, 13, which are also co-hinged to respective carriages 30, the latter being slidingly received in the slots 4, 5, 6 between the ends of the latter that face toward the center "C" and the pivots 19.

In other words, the pivots 19 slide within the slots 4, 5, 6 between the carriages 30 and the ends of the slots that face toward the exterior of the body 2, whereas the carriages 30 slide between the pivots 19 and the opposite ends of the slots 4, 5, 6, which nevertheless face toward the center "C".

Thus, the slots 4, 5, 6 are guide means both for the pivots 19 and hence the ends of the first connecting rods 20 and for the carriages 30 and hence the ends of the second connecting rods 30.

As shown in the Figures, the disk 21 has a coaxial hub 31 with an axial hole 32 which is designed to receive the shafts of standard supports of wheel alignment measuring instruments for vehicle wheels "R".

The operation of the bracket for vehicle wheel alignment control instruments of the invention is as follows:

when an operator has to measure or correct the alignment of a wheel "R" of a vehicle, without removing it from the hub thereof upon which it is fixed, he/she will first rotate the triangular plate 25, thereby causing the three prismatic pads 11, 12, 13 to simultaneously radially slide along the slots 4, 5, 6 until they are arranged on an ideal circumference, corresponding to the circumference of the tire side "P".

Figure 7:
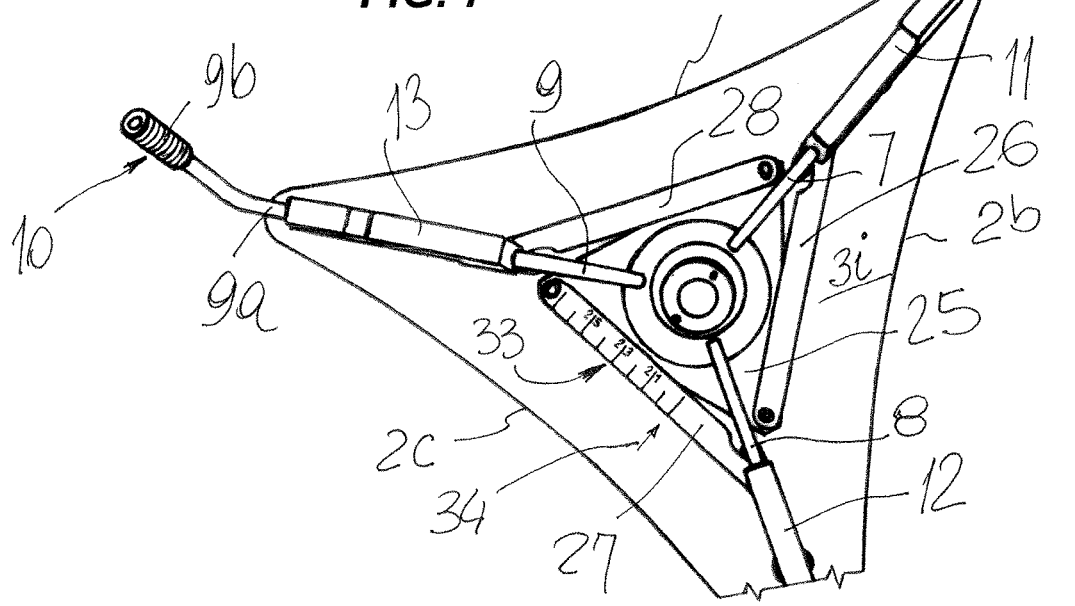
FIG. 7 is a broken-away schematic view of the inner face of the bracket of the invention, in which the ends of two brackets arms are shown.

For this operation to be exact, a graduated scale, e.g. in inches, corresponding to the units of the diameters of tires "P", is provided on at least one of the second connecting rod, e.g. the second connecting rod 27 (see FIG. 7), and is interfaced with a fixed reference 34 to allow the user to read the exact position of the prismatic pads 11, 12, 13 which now slide along the arms 7, 8, 9, the latter being stationary.

Then, the operator rotates the knob 24, which in turn rotates the disk 21, the latter causing the arms 7, 8, 9 to slide in the prismatic pads 11, 12, 13, i.e. outwards with respect to the body 2, guided by the pivots 19 that slide in the slots 4, 5, 6.

Thus, the ends 7a, 8a, 9a will simultaneously move away from one another in the centrifugal direction, until they can entirely encircle the wheel "R", lying over the tread of the tire "P".

In this position, the three prismatic pads 11, 12, 13 that have been previously positioned, abut the side "F" of the tire "P" in a proper position, such that the position of the body 2 with respect to the axis of rotation of the wheel "R" is well centered.

Then, the operator turns the knob 24 again, but in an opposite direction, to move the ends 7a, 8a, 9a toward one another, until the latter abut the surface of the tread of the tire "P" and the projecting crests 10 engage in the groves thereof, referenced "SC" in the Figures for clarity, thereby stably fastening the bracket 1 to the wheel "R".

Now, the operator may introduce the measurement and control instruments into the hole 32 and have an exact reference for any check or adjustment to be made.

It shall be noted that the body 2 has the characteristic of being made of a very light material, such as carbon, aluminum or alloys thereof or may have a so-called "honeycomb" structure, which make the bracket 1 very easy to handle, with not much effort being required even with repetitive use.

The skilled person will understand that other materials having light-weight and high strength properties like those exemplarily mentioned above, may be used to form the bracket 1.

The invention has been found to fulfill the intended objects.

The invention so conceived is susceptible to changes and variants within the inventive concept.

Also, all the details may be replaced by other technical equivalent elements.

In its practical implementation, any material, shape and size may be used as needed, without departure from the scope as defined by the following claims.

The invention claimed is:

1. A bracket (1) for control instruments of wheel (R) alignment of a vehicle, comprising:
   a center body (2) having a center (C), an outer face (3e), and an opposing parallel inner face (3i) facing a wheel (R) in a use configuration of the bracket (1);
   a group of three grasp arms (7, 8, 9) having respective distal ends with respect of the center (C), said distal ends being equipped with grasping members (10), said arms being contemporarily slindingly mounted with respect of the center body (2) toward centrifugal or centripetal directions and reciprocally spaced, actuated by a first actuating system (17) and guided by first guiding devices (18) between grasping positions by said grasping members or releasing positions of the wheel (R); and
   leaning spacers (11, 12, 13) of the bracket (1) parallel to a side (F) of the wheel (R), which are contemporaneously movable according to radial directions with respect of said center (C) among adjustable leaning positions;
   wherein said leaning spacers (11, 12, 13) are mounted on said center body (2) to be independently sliding from said arms (7, 8, 9), movably actuated by a second actuating system (25, 26, 27, 28) independently from said first actuating system (17) and guided by said first guiding devices (18).

2. The bracket as claimed in claim 1, wherein said center body (2) is made from a light material chosen from the group consisting of a synthetic material, a material having a tri-dimensional alveolar structure, aluminum, or alloys aluminum.

3. The bracket as claimed in claim 1, wherein said leaning spacers comprise a group of three prismatic bumpers (11, 12, 13) having a same thickness (SP), in a mounted configuration on a wheel (R) of said bracket (1), said bumpers being fitted between said inner face (3i) of the center body (2) and said side (F) of a wheel (R).

4. The bracket as claimed in claim 3, wherein said first actuating system comprises:
   a center disk (21) rotatably supported concentrically with said center (C) on said outer face (3e) of the center body (2);
   a group of three first connecting rods (20) between the center disc (21) and respective arms (7, 8, 9), each connecting rod having their own ends hinged to respectively said center disc (21) and a proximal zone of a corresponding arm (7, 8, 9);
   a circular solidly rotatable rack (22) circularly obtained on said center disc (21); and
   a maneuvering sprocket (23) rotatably supported on said outer face (3e) of said center body (2), designed to be manually actuated to rotate said rack (22) and said center disc (21).

5. The bracket as claimed in claim 4, wherein said second actuating system comprises:
   a center plate (25) that is rotatably supported concentrically with said center (C) on said inner face (3i) of said center body (2), independently from said center disc (21); and
   a group of three second connecting rods (26, 27, 28) having ends hinged to said center plate (25) and to a proximal end (14) with respect of said center (C) of a respective tri-dimensional bumper (11, 12, 13).

6. The bracket as claimed in claim 5, wherein said first guiding devices comprise:
   a group of three pass-through rectilinear grooves (4, 5, 6) obtained in said center body (2);
   first transversal pins (19) slidingly engaged in said grooves (4, 5, 6) and associated with said group of three first connecting rods (20);
   second saddles (30) slidingly engaged in said grooves (4, 5, 6) and associated with said group of three second connecting rods (26, 27, 28).

7. The bracket as claimed in claim 3, wherein between said group of three arms (7, 8, 9) and tri-dimensional bumpers (11, 12, 13), second guiding devices (35) of the group of three arms (7, 8, 9) with respect to the tri-dimensional bumpers (1, 12, 13) are interposed.

8. The bracket as claimed in claim 7, wherein said second guiding devices comprise, for each arm, a pass-through seat (35) obtained in a corresponding thickness (SP) of a bumper, and wherein said arm is received in a sliding way with respect of the bumper.

9. The bracket as claimed in claim 1, wherein said radial directions are reciprocally placed at 120°.

10. The bracket as claimed in claim 5, wherein, between at least one of said group of three of said second connecting rods (26, 27, 28) and said inner face (3*i*) of the center body (2), a diameter pre-selection indicator is interposed.

* * * * *